UNITED STATES PATENT OFFICE.

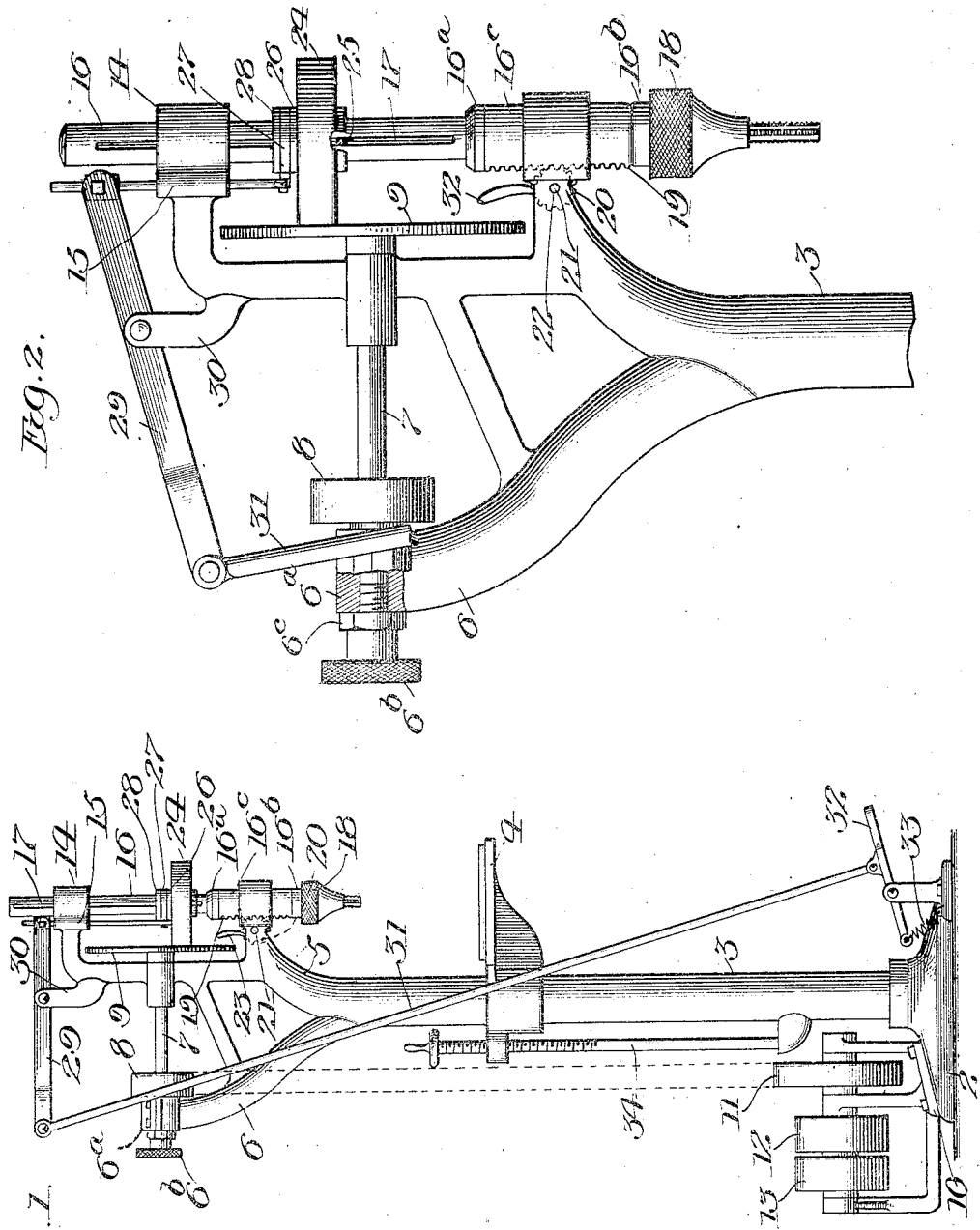

JOHN M. LARSON, OF CHICAGO, ILLINOIS, ASSIGNOR OF ONE-HALF TO WALTER W. CURTIS, OF CHICAGO, ILLINOIS.

TAPPING-MACHINE.

934,407.

Specification of Letters Patent. Patented Sept. 14, 1909.

Application filed July 20, 1908. Serial No. 444,523.

*To all whom it may concern:*

Be it known that I, JOHN M. LARSON, a citizen of the United States, residing at Chicago, in the county of Cook and State of Illinois, have invented a new and useful Tapping-Machine, of which the following is a specification.

My present invention relates to improvements in tapping machines for cutting interior threads in which it is necessary to reverse the direction of rotation of the tool or tap so that it may be screwed out after the hole has been threaded. My invention has special reference or applicability to light and delicate work, and has for its objects; first, the provision of facilities for enabling comparatively inexperienced operators to secure the introduction and removal of the tap into and from the work squarely and with precision; and, second, to secure the reversal of the direction of rotation of the tap easily and gently so as to prevent the breaking of the tap which is extremely liable to occur with taps of small diameter as such tools are hard and brittle.

I secure the above objects by means of the mechanism illustrated in the accompanying drawings, in which, Figure 1 is a side elevation of a machine embodying my invention; and, Fig. 2 is a detail of the top of the machine, partially in section, showing the lever mechanism for controlling the rotation of the tap.

Similar reference numerals refer to similar parts throughout the several views.

The reference numeral 2 designates a base or foot, usual in like kinds of machinery, from which rises a column, 3. Slidably mounted upon the column, 3, is the plate or table, 4, adapted to support the work during the tapping operation. The top of the column, 3, is provided with the branch, 5, curving outwardly over the table, 4, and the branch, 6, extending in an opposite direction to the branch, 5. Suitable bearings are provided in the branches, 5 and 6, for mounting the horizontally disposed shaft, 7, which is provided between its bearings with the drive pulley, 8. The shaft, 7, extends beyond its bearing in the branch, 5, and upon the end thereof which is above the table, 4, it is provided with the friction disk, 9. The other end of the shaft, 7, extends only partially into the bearing, 6ª, in the branch, 6. The outer portion of the bearing, 6ª, is threaded to accommodate the knurled headed bolt, 6ᵇ. The bolt, 6ᵇ, is provided with the lock nut, 6ᶜ. It is obvious that by screwing the bolt, 6ᵇ, into the bearing, 6ª, and locking it in position with the nut, 6ᶜ, the shaft, 7 and the disk, 9, will be thrown forward for a purpose hereafter described.

The base or foot, 2, is provided with a mounting, 10, for the drive pulleys, 11 and 12, and an idler, 13. The idler, 13, and the drive pulley, 12, are adapted to be connected by a belt (not shown) in the usual way with a power shaft (also not shown). The drive pulley, 11, alines and is adapted to be connected by means of a belt with the drive pulley, 8, upon the shaft, 7.

The branch, 5, extends above and over the friction disk, 9, and is provided upon its outer end with the vertically disposed bearing, 14, and guide slot, 15.

Revolubly and slidably mounted in the bearing, 14, is the spindle, 16, which is provided with the slot or spline, 17, and upon its lower end with the chuck, 18, adapted to hold the tap.

Upon the lower portion of the spindle, 16, between the shoulders, 16ª, and 16ᵇ, is mounted the collar, 16ᶜ. One face of the collar, 16ᶜ, is provided with the rack, 19, which is engaged by the gear, 20, carried by the rod, 21, which revolves in the bearing, 22, in the branch, 5, and is operated by the handle, 23, to advance the spindle toward and withdraw it from the table, 4.

To cause the spindle, 16, to rotate, it is provided with the friction wheel, 24, slidably mounted thereon, and having a lug, 25, extending therefrom into the slot or spline, 17. The periphery of the friction wheel, 24, contacts with and receives motion from the friction disk, 9. It is obvious that the point of contact between the disk, 9, and wheel, 24, with respect to the center of the disk, 9, will determine both the direction and speed of rotation of the spindle, 16, and thereby the tap. It is further obvious that no matter how quickly the wheel, 24, may be shifted across the center of the disk, 9, the rotation of the spindle, 16, will be gradually reduced and started up in the other direction so that the jar and jerk which so often breaks small taps will be entirely done away with.

To secure the desired shifting of the wheel, 24, I have provided the rod, 25ª, working in the guide slot, 15, the lower end of which is attached to the ring, 26, which projects into an annular slot, 27, provided in the hub, 28, of the friction wheel, 24. To the upper end of the rod, 25ª, is pivoted the lever arm, 29, supported by the bracket, 30, carried by the branch, 5, and from the opposite end of the arm, 29, extends the rod, 31, to the foot lever, 32. The foot lever, 32, is provided with the spring, 33, so that the operator can control both the direction and speed of the tap by depressing or releasing the foot lever.

The threaded rod, 34, is provided for adjusting the elevation of the table, 4, but this is no portion of my present invention. The combination, however, of a proper positioning table with tap driving mechanism as above described is an extremely important and valuable feature of the present invention, in that without such a table the accuracy and precision of the work is entirely dependent upon the experience of the mechanist. With such a table and such tap driving mechanism the relation of the work to the tool is determined, and liability of error, except through gross carelessness, is excluded.

By properly adjusting the bolt, 6ᵇ, the friction between the disk, 9, and wheel, 24, can be so regulated that the spindle, 16, will cease to rotate at a point where its further rotation would break the tap. This is an extremely useful possibility in tapping to the bottom of blind holes, as the operator has only to continue to run the machine until the tap ceases to rotate and then reverse the machine. All necessity for removing the tap for inspection during the progress of the work is done away with, as the tap will stop without breaking when the bottom of the hole has been reached.

Having described my invention, what I claim as new and desire to secure by Letters Patent is:—

In combination, a tool carrying spindle having a splineway therein, a friction wheel longitudinally movable thereon and having a lug extending into said splineway, a friction disk mounted at right angles with said friction wheel and in contact with the periphery thereof, an annular collar extending into the hub of said friction wheel, a rod attached to said collar, a pivoted arm having one end connected with said rod, a second rod passing from the other end of said arm to a foot lever, and a spring for maintaining said rods and levers in one position.

In testimony whereof I have hereunto set my hand in the presence of two witnesses.

JOHN M. LARSON.

Witnesses:
W. W. CURTIS,
BENJ. T. ROODHOUSE.